J. O. McCREERY.
HAY RETAINING DEVICE FOR HAY STACKERS.
APPLICATION FILED DEC. 26, 1906.
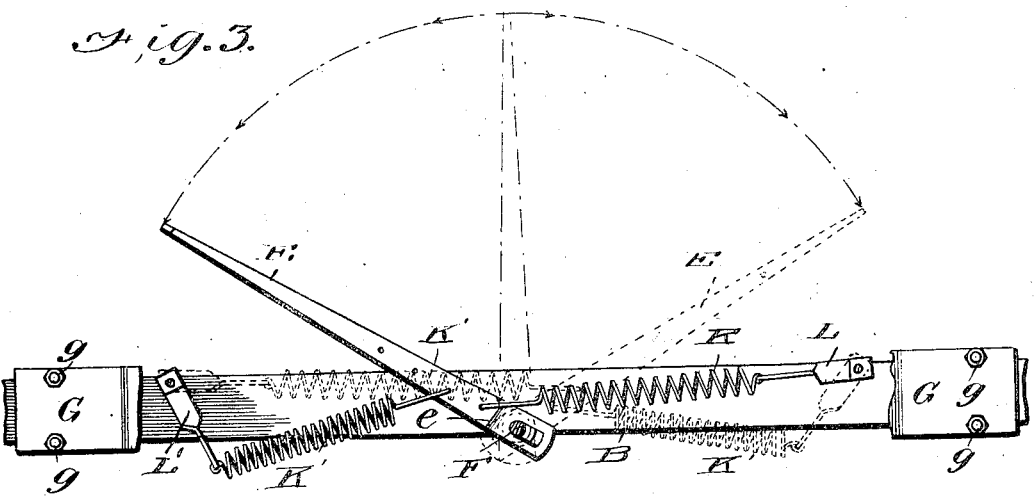
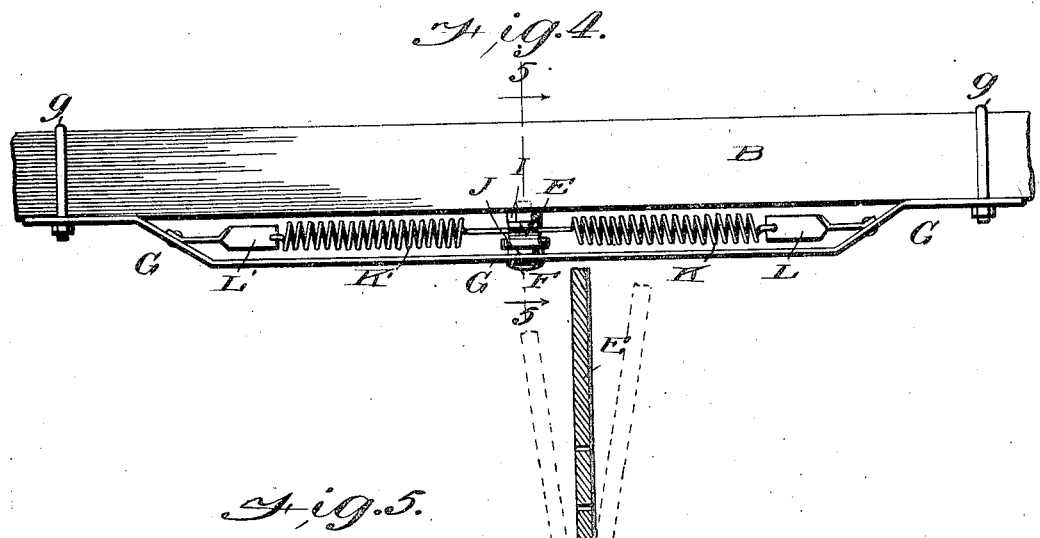
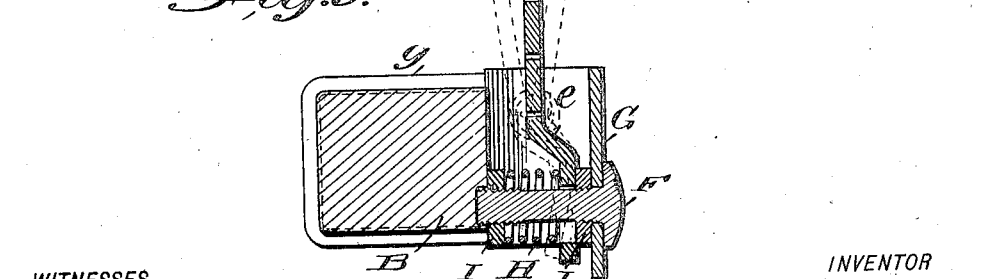
WITNESSES
F. C. Barry
Amos W Hart
INVENTOR
JESSE O. McCREERY
BY Munn & Co.
ATTORNEYS

UNITED STATES PATENT OFFICE.

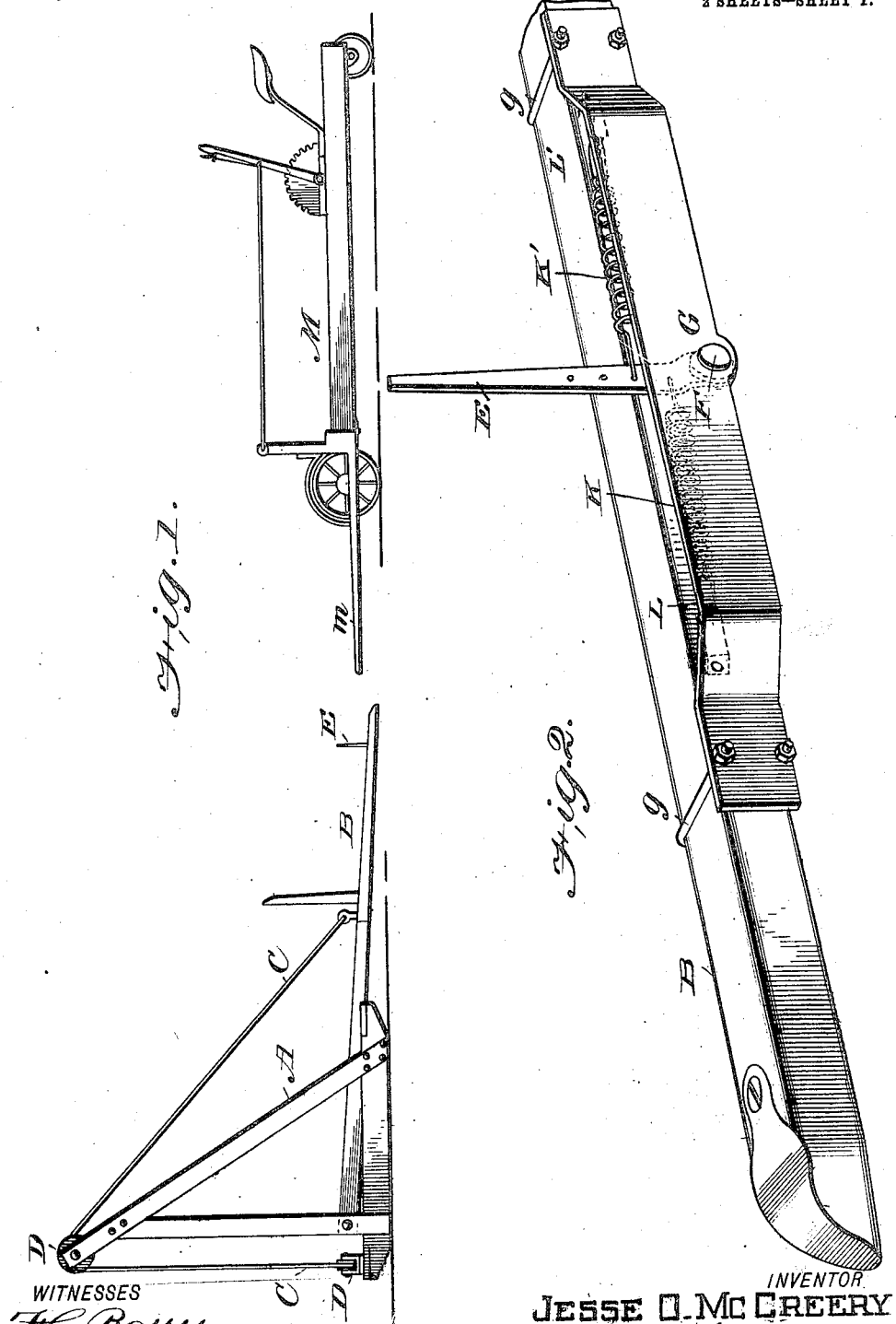

JESSE O. McCREERY, OF FORT MORGAN, COLORADO.

HAY-RETAINING DEVICE FOR HAY-STACKERS.

934,827.

Specification of Letters Patent.  Patented Sept. 21, 1909.

Application filed December 26, 1906.  Serial No. 349,481.

*To all whom it may concern:*

Be it known that I, JESSE O. MCCREERY, a citizen of the United States, and a resident of Fort Morgan, in the county of Morgan and State of Colorado, have invented an Improved Hay-Retaining Device for Hay-Stackers, of which the following is a specification.

In a well known class of apparatus for use in stacking hay, a series of parallel teeth are pivoted to a head forming part of the frame of the stacker which rests on the ground. The hay is carried up to the stacker and deposited thereon by what is commonly termed a "bull," or sweep, rake. The teeth of the stacking apparatus have been provided with pivoted fingers for retaining the hay thus deposited thereon, said devices being adapted to release the hay when the teeth of the stacker are raised for throwing the hay backward.

My invention is an improvement in the construction and attachment of the hay-retaining fingers.

The details of construction, arrangement, and combination of parts are as hereinafter described and illustrated in the accompanying drawing, in which—

Figure 1 is a side view of a stacker and a "bull," or sweep, rake such as commonly used for depositing hay on the stacker. Fig. 2 is a perspective view of one of the teeth of the stacker provided with my improved attachment. Fig. 3 is a side view of the parts shown in Fig. 2, save that a portion of the side guard is broken away. Fig. 4 is a plan view of the parts shown in Fig. 2. Fig. 5 is an enlarged cross section on the line 5—5 of Fig. 4.

In Fig. 1, A indicates the frame of the stacker, and B the teeth thereof which are pivoted to the frame and adapted to be raised from a horizontal, to a vertical, position, this being commonly effected by a rope C passing over pulleys D, D. To each of the teeth B my improved attachment is applied in the following manner. E indicates what is commonly termed a finger, the same constituting the hay-retaining device proper. Instead of being pivoted, as usual in this class of devices, in a slot formed in the tooth B, which obviously weakens the latter, it is pivoted on the side of the tooth, the pivot being a screw bolt F which passes through a guard plate G, as shown best in Fig. 5. This guard plate is constructed of stout strap iron and the body thereof is spaced from the tooth B, its ends being secured by clevises $g$. A spiral spring H, see Fig. 5, is applied to the inner end of the screw bolt F and a nut I serves to compress the same. The finger E is arranged between the spring and a nut J which spaces it from the side of the guard G, and also secures the nut in place. The finger E is provided with a slot, or enlarged opening, to receive the bolt. The spiral spring K, see Figs. 2, 3, 4, is connected with the finger E on one side and a corresponding spring K' on the other side. Each spring is further connected with the guard by means of a bar or narrow plate L, the same being pivoted to the guard plate.

At a point above the guard plate the finger E is provided with a lateral bend $e$, so that the upper portion thereof is carried inward and thereby brought nearer alinement with the side of the tooth B. It is apparent that, by means of the springs H, K, K', the finger E is held normally in upright position, but that when sufficient force is applied the springs yield so that the finger may be moved in any direction, and may in fact describe a circle. Thus, when the "bull" rake M is run up over the stacker teeth B, for the purpose of depositing hay thereon, the fingers E will be pressed backward as shown by full lines Fig. 3, and when the rake is run back, leaving the hay on the teeth B, the fingers E swing over to the inclined position shown by dotted lines Fig. 3; and then, by the action of the springs K', they resume their normal vertical position shown in Figs. 1, 2, 4. This adaptation of the fingers E to swing in either direction, also facilitates the discharge of hay from the teeth when the stacker is swung up for unloading the hay on the stack. In brief, the fingers can be carried to an extreme inclination, or nearly 90° forward or back; but owing to the fact that the spring K' is connected with the fingers at a higher point than the spring K, a greater pressure would be required to force the fingers over toward the points of the teeth B. The fingers are provided with a series of openings to allow the point of attachment of the springs K' to be shifted in order to increase or lessen the resistance of the fingers to such movement, so that they hold the hay on the teeth more effectively than would otherwise be the case.

The adaptation of the fingers for lateral movement relative to the teeth B, as indicated by dotted lines Fig. 5, is important, since it prevents their being injured by the teeth m of the sweep or "bull" rake coming in contact with them when the rake is run up over the stacker, so that there is no danger of the fingers being broken or injured as would otherwise be the case. The guard plate G also serves as a means for braking, or arresting, the rake M, since the front wheels of the latter come in contact with the inclined front ends of the guard plate when the rake is run up over the stacker. Thus the guard plates act as buffers preventing injury to the fingers and the attachments thereof. Further, the inclination of the front ends of the guard plates G tends to push the wheels of the rake laterally so that there is less liability of injury to the fingers E by contact with the teeth of the rake. As illustrated in Fig. 3, when the finger E is inclined in one direction, the spring plate L on that side drops down into a position at right angles to the spring so both are thus out of the way of the finger.

What I claim is—

1. The combination, with a stacker frame and its parallel teeth, of a series of fingers, a guard plate attached to the side of each tooth, a bolt passing through the same upon which the finger is loosely mounted, a spring applied to said bolt and pressing the finger laterally, and other springs connected with the finger on opposite sides and arranged parallel to the tooth, and means for connecting them with the guard plate whereby the finger is adapted to yield in every direction, substantially as described.

2. The combination, with a stacker tooth, of a hay-retaining finger which is pivoted to the tooth and springs connected with the same and extending in opposite directions along the tooth, whereby said finger is adapted to yield in both directions, substantially as described.

3. The combination, with a stacker tooth, of a hay-retaining finger, a pivot bolt upon which said finger is loosely mounted so that it may oscillate laterally, and a spring applied to said bolt and pressing against the finger whereby it tends to hold said finger in a normally upright position, substantially as described.

4. The combination, with a stacker tooth, of the hay-retaining attachment comprising a guard plate attached to the side of a tooth and the body thereof spaced from the tooth, a bolt arranged in the space between the plate and tooth, a hay-retaining finger pivoted on the bolt, and yielding means connected with the finger for holding it normally in an upright position, substantially as described.

5. The combination, with a stacker tooth, of a hay-retaining attachment comprising a side guard plate, a pivot bolt, a finger mounted rotatably thereon, springs connected with the finger and extending in opposite directions, and pivoted bars connecting said springs with the end portions of the guard, substantially as described.

6. The combination with a holder adapted to be secured to a stacker tooth, of a hay retainer consisting of a finger and two spiral springs on said finger near its lower end and adapted to be secured by their opposite ends in said holder.

JESSE O. McCREERY.

Witnesses:
G. W. SHELTON,
J. B. FARNSWORTH.